United States Patent [19]

Nist, Jr.

[11] E Re. 30,373

[45] Reissued Aug. 19, 1980

[54] SHIPPING BUNDLE FOR NUMEROUS PIPE LENGTHS

[75] Inventor: Ferdinand J. Nist, Jr., Enumclaw, Wash.

[73] Assignee: Seattle Box Company, Kent, Wash.

[21] Appl. No.: 965,294

[22] Filed: Dec. 1, 1978

Related U.S. Patent Documents

Reissue of:

[64] Patent No.: 4,099,617
Issued: Jul. 11, 1978
Appl. No.: 769,542
Filed: Feb. 17, 1977

[51] Int. Cl.[2] ..... B65D 85/20

[52] U.S. Cl. ..... 206/443; 53/443; 100/2; 138/106; 206/83.5; 206/597; 248/49; 410/42

[58] Field of Search ..... 53/26; 100/2; 105/466, 105/469, 470–473; 138/106; 217/66–68; 206/83.5, 322, 442–443, 585, 587–589, 593, 597; 248/49, 54 R, 499, 505

[56] References Cited

U.S. PATENT DOCUMENTS

| | | | |
|---|---|---|---|
| 2,059,390 | 11/1936 | Pagel | 206/443 |
| 2,075,711 | 3/1937 | Gilley | 114/27 X |
| 2,491,013 | 12/1949 | Noll et al. | 220/3 |
| 2,778,491 | 1/1957 | Taylor et al. | 206/322 |
| 2,849,027 | 8/1958 | Tetyak | 206/443 X |
| 2,850,182 | 9/1958 | Tetyak | 206/443 X |
| 2,990,951 | 7/1961 | Fallert | 206/443 X |
| 3,220,583 | 11/1965 | Robertson | 206/443 X |
| 3,223,234 | 12/1965 | Weiss | 206/587 X |
| 3,263,830 | 8/1966 | Anderson | 214/10.5 R |
| 3,283,893 | 11/1966 | Durocher et al. | 206/443 |
| 3,476,260 | 11/1969 | Jay | 214/10.5 R |
| 3,581,929 | 6/1971 | Guenard et al. | 206/443 X |
| 3,734,281 | 5/1973 | Armstrong | 206/443 X |
| 3,747,780 | 7/1973 | Schneider | 214/10.5 R |
| 3,802,987 | 4/1974 | Noll | 206/443 X |

FOREIGN PATENT DOCUMENTS

| | | | |
|---|---|---|---|
| 2208139 | 8/1973 | Fed. Rep. of Germany | 206/443 |
| 1460399 | 10/1966 | France | 206/442 |
| 56217 | 6/1967 | German Democratic Rep. | 214/10.5 |

*Primary Examiner*—Herbert F. Ross
*Attorney, Agent, or Firm*—Ford E. Smith; David L. Garrison

[57] ABSTRACT

A bundle for shipping and the storage of a plurality of elongated pipe lengths of a common size arranged in tiers is disclosed in which the longitudinal axes of the pipes in the bundle are disposed parallel to an elongated base formed of spaced-apart transverse sleepers. The pipes in each tier are separated by divider blocks standing on the sleepers and separating overlying sleepers from those there-below a distance substantially equal to or greater than the pipe diameter. Strapping encircles the sleepers and the dividers and the pipe therebetween to secure the bundle in a flexible manner throughout its length to accommodate the rigors of hoisting and transporting its storage in multiple bundles and on uneven supporting surfaces.

12 Claims, 8 Drawing Figures

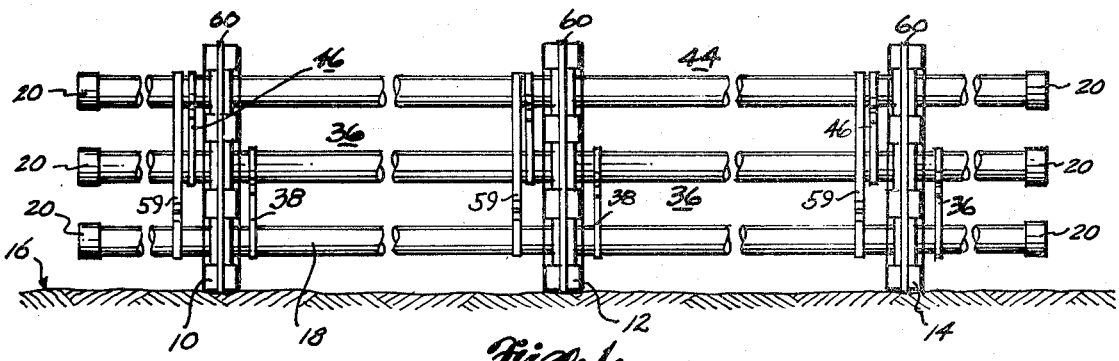
Fig. 1.
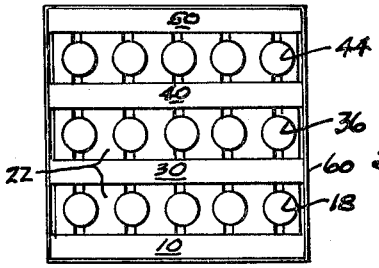
Fig. 2.
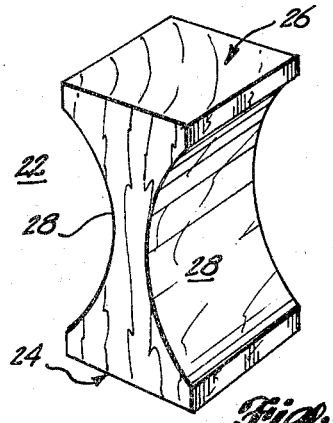
Fig. 3.
Fig. 4.
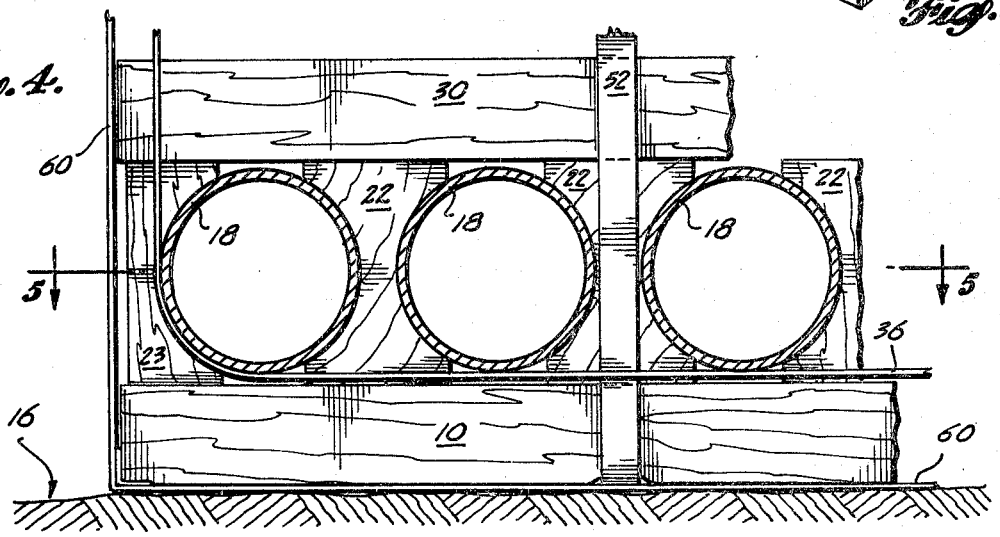
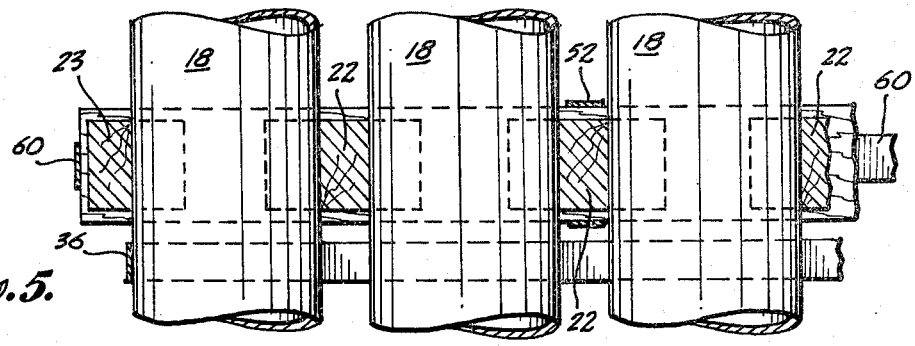
Fig. 5.

Fig. 6.
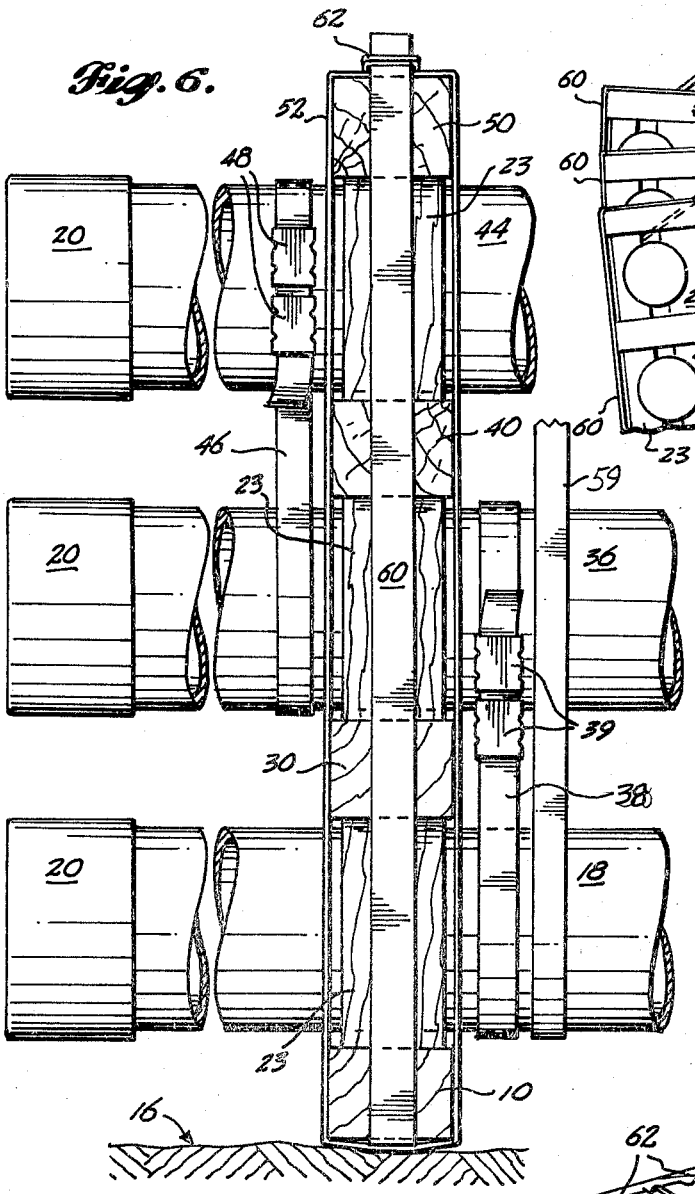
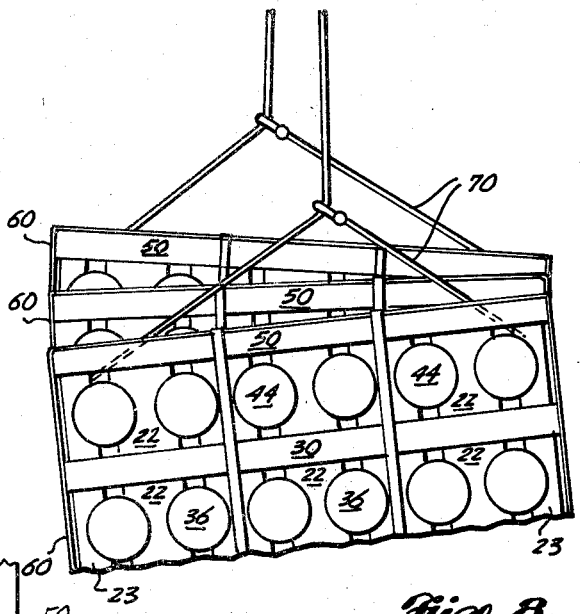
Fig. 8.
Fig. 7.
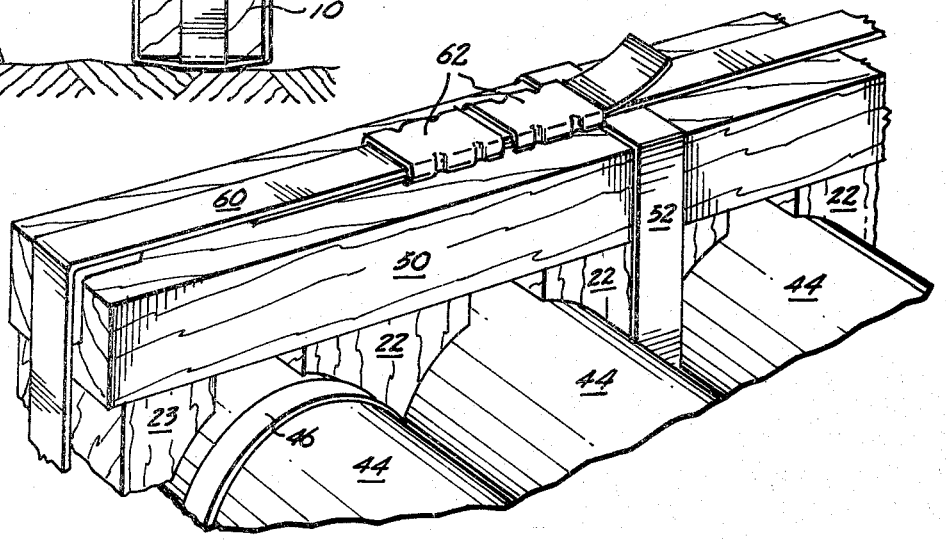

SHIPPING BUNDLE FOR NUMEROUS PIPE LENGTHS

Matter enclosed in heavy brackets [ ] appears in the original patent but forms no part of this reissue specification; matter printed in italics indicates the additions made by reissue.

BACKGROUND OF THE INVENTION

During the past several years the increased and often frantic activity in the exploration for oil in the remote areas of the world and in its transmission from developed wells has occurred. This has involved the shipment of great quantities of pipe of a wide range of sizes and very great lengths. Some of the pipe is drilling, and other of the pipe sections are for well casing purposes or to convey the oil once it has been located. In most cases the pipe sections must arrive at their eventual point of use without bends, dents or damaged ends—all conditions that have occurred when bundles of pipe have been shipped loose or strapped together without protective structure. In those known cases in the prior art where composite bundling has been disclosed, pipe sections have been cradled in underlying concave shoes and then capped with like but inverted non-contacting shoes and the whole fastened together. In such cases any weight applied to a bundle, as by a second similar bundle stacked thereon, is applied directly to the pipe sections and at localized or restricted positions. The pipes may thus be crushed or otherwise deformed.

In other instances it is known to form a rack of side-by-side pipes between a pair of bolsters and to surmount the first rack with a second rack of pipe sections, a third bolster and even a third rack of pipes not necessarily with a fourth bolster. The adjacent pipes are neither separated from each other nor are they separated from the bolsters. As a result, when such bundles are stacked, the lower bundles support the weight of upper bundles, and such weights can be considerable. Depending on pipe sizes and lengths, the dead weight of such bundles can be several tons per bundle. Damage is extremely likely under such practices. This is particularly true when the pipes may shift within the bundle. Straps can be broken and the pipe surfaces can be gouged or worn destroying protective coatings.

SUMMARY OF THE INVENTION

According to this invention a base is formed of a first plurality of transverse sleepers arranged in spaced-apart disposition on a work surface or floor. The length of this base is usually less than the overall length of the long pipe sections to be bundled. A first tier of pipe lengths in side-by-side disposition is deposited on the base, each adjacent pipe pair being separated by divider blocks having concave sides to cradle the pipes. Preferably the height of the divider blocks is equal to or slightly greater than the pipe diameter. A second plurality of sleepers is placed in overlying relation to said first set of sleepers and the divider blocks standing thereon. Then a second tier of pipe lengths, likewise separated as described, is placed on the second set of sleepers. This assembly is then completed by the addition of a third set of sleepers and integrated by an encircling, tightly-bound strap means at each station. The pipes are drawn into the concavities of the divider blocks and become individually suspended within the bundle. They are out of contact with each other and with the sleepers, yet, because of their extreme lengths, are free to flex and twist without harm or endwise movement during handling or transhipment.

DESCRIPTION OF THE DRAWINGS

FIG. 1 is a side elevational view of a shipping bundle of lengthy pipes of like diameters in tiered and interconnected disposition according to the present invention;

FIG. 2 is an end elevational view of a shipping bundle;

FIG. 3 is a perspective view of a divider block used in the pipe tiers;

FIG. 4 is an enlarged cross-sectional view of a lower corner of a bundle;

FIG. 5 is a transverse view in the plane 5—5 of FIG. 4;

FIG. 6 is an enlarged side view of an end portion of a bundle;

FIG. 7 is an enlarged perspective view of a bundle portion at the top of a tier of sleepers; and FIG. 8 is an illustrative end view of a bundle depicting how a bundle may rack due to its inherent flexibility.

DESCRIPTION OF THE INVENTION

A shipping bundle according to this invention comprises a base formed of a first plurality of sleepers 10, 12 and 14 arranged parallel with each other in spaced-apart relation on a supporting surface 16. A tier of pipe lengths 18 initially lie on the sleepers in parallel relation to each other. Such pipe lengths may be 20, 30 or even 50 or 60 feet in length, and their diameters may be in the range of 2 inches to 20 or 24 inches. Their ends are usually protected against damage by sleeves 20.

As can best be seen in FIGS. 4 and 5, adjacent pipes 18 are separated by divider blocks 22. A single block 22 is shown in FIG. 3 as having a bottom 24, a top 26 and opposed concave curved sides 28. Preferably the curvature of the concave sides 28 is equal to the external curvature of pipes between which blocks 22 are disposed. Normally the length of blocks 22 is slightly greater than the diameter of the pipe with which they are to be used. At the sides of each tier of pipes are half-blocks 23. When the blocks 22, 23 and pipes 18 of the lowermost tier are in place on the sleepers 10, 12 and 14, a next series of sleepers 30, 32 and 34 is placed to traverse the pipe tier in overlying alignment with sleepers of the base.

In the manner as described, a second tier of pipes 36 with divider blocks 22 and end blocks 23 is formed. At this juncture the two lower tiers 18 and 30 may be encircled with a strap 38, the ends of which are overlapped as shown in FIG. 6 and, under tension, tightly secured by crimped strap-anchors 39.

Similarly, a third tier of sleepers 40, divider blocks 22, end blocks 23 and pipes 44 is arranged to overlie the second tier. The pipes 36 of the second tier and the pipes 44 of the third tier may also be encircled by strap 46 with its ends secured by crimped anchor clips 48. Straps 38 and 46 draw the pipes and the intervening divider blocks 22, 23 tightly together so that the pipes are neatly and firmly seated or cradled in the curved sides 28 of the divider blocks. This tends to lift the pipes off the sleepers and transfer the weight from the above to the upright columns provided by the divider blocks 22 and the sleepers.

Finally in the case of a three-tier bundle, a fourth set of sleepers 50 is disposed across the bundle, as best seen in FIGS. 6 and 7. At that point, the superposed sleepers 10, 30, 40 and 50 are tightly encircled between their ends by one or more straps 52, their ends being crimped by anchor clips as described. Straps 52 draw the sleepers of the base, the intermediate tiers and the top set tightly to the intervening divider blocks. Straps 59 encircling all pipes in the several tiers are often applied to tighten the bundles.

Next, straps 60 encircle all sleepers at each station and, under tension from strap-anchoring apparatus, have their overlapped ends secured in crimped anchor-clips 62 as shown in FIG. 7. The application of straps 60 secures all the pipes of the several tiers into a firm but flexible bundle that may be placed on an uneven ground or other supporting surface without injury to the pipes involving bending or twisting in which the inherent flexibility of the pipe is permitted to play while at the same time the pipe is protected from normal hazards.

In FIG. 8 is illustrated a common hazard that a shipping bundle may be subjected to. In this end view the bundle is being supported by two hoisting bridles 70, 70 that have been placed about the bundle at spaced-apart positions which may be 20 or more feet apart. Because of the flexible bundling system disclosed herein the bundle may twist material as shown but without harm to the pipe sections. The pipes "work" in the opposed concavities of adjacent divider blocks as the bundle is malformed without injury. It has been observed that differences of several inches in the respective height of the several sleepers may easily be tolerated. Also, the twist of a large bundle may involve several degrees of difference between bundle ends.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the legitimate and valid scope of the appended claims, appropriately interpreted in accordance with the doctrine of equivalents.

What is claimed is:

1. A shipping bundle formed of a plurality of lengths of pipe of a common size, comprising:

a base formed of a first plurality of transverse sleepers located in spaced-apart parallel arrangement;

a tier of pipe lengths resting on said base, adjacent pipe lengths of said tier being separated by blocks in transverse series, each block having opposed concavities substantially embracing the curved sides of said adjacent pipe lengths;

each of said series of blocks being located to stand on one of said sleepers and being of a height *substantially equal to or* greater than the thickness of the tier of pipe lengths;

a second plurality of sleepers, each traversing said pipe tier in overlying alignment with a sleeper of said first plurality, the sleepers of said second plurality being supported on the series of separating blocks; and a bundling strap tightly encircling each sleeper of said first plurality, the separating blocks resting thereon, and the respective overlying sleeper.

2. A shipping bundle according to claim 1 in which there is:

a second tier of pipe lengths resting on said second plurality of sleepers, adjacent pipes of said second tier being separated by blocks in the same manner as said first tier of pipes;

a third plurality of sleepers, each traversing said second tier in overlying alignment with the sleepers of said first and second pluralities; and said bundling strap tightly encircles the sleepers of said first and third pluralities, and the pipe tiers and separating blocks associated therewith.

3. A shipping bundle according to claim 2 in which there is:

a third tier of pipe lengths resting on said third plurality of sleepers, adjacent pipes of said third tier being separated by blocks in the same manner as said first and second tiers of pipes;

a fourth plurality of sleepers, each traversing said third tier in overlying alignment with the sleepers of said first, second and third pluralities; and said bundling strap tightly encircles the sleepers of said first and fourth pluralities, and the pipe tiers, the separating blocks associated therewith, and the sleepers interposed between said pipe tiers.

4. A shipping bundle according to claim 3, in which:

intermediate the lengths of aligned sleepers of said first, second, third and fourth pluralities at each location, strap means is threaded between superposed like pairs of pipes in each tier and is tightly secured about said aligned sleepers.

5. A shipping bundle according to claim 4, in which:

a bundling strap tightly encircles the pipes of said first and second tier in close proximity to at least some of said locations.

6. A shipping bundle according to claim 3 in which there is at least one additional tier of block-separated pipe lengths surmounted by a sleeper and encircled by said bundling strap.

7. The method of bundling a plurality of lengths of pipe of a common size, comprising:

forming a first bundle base by laying down a first plurality of transverse sleepers in spaced-apart parallel locations;

depositing a first tier of pipes [of] *on* said bundle base and chocking adjacent pairs of pipes of said tier in spaced-apart relation;

traversing the first tier of pipes with transverse sleepers aligned with said first plurality at each location to form a second overlying bundle base;

depositing a second tier of pipes on said second bundle base and chocking adjacent pairs of pipes of said tier in spaced-apart relation;

tightly strapping the pipes of said first and second tiers adjacent at least the outermost sleepers of said first and second bundle bases;

traversing the second tier of pipe with transverse sleepers aligned with said first and second pluralities at each location to form a third overlying bundle base;

depositing a third tier of pipes on said third bundle base and chocking adjacent pairs of pipes of said tier in spaced-apart relation;

tightly encircling the pipes of said first and third tiers with strapping adjacent at least two of said locations;

overlaying the third tier of pipes with transverse sleepers aligned with said first, second and third pluralities at each location to top off said bundle;

tightly encircling the sleepers at each location with strapping extending transverse said bundle; and threading and tightly securing strapping between like pairs of pipes in each tier at each location and about the medial portions of the sleepers.

*8. The method of bundling a plurality of lengths of pipe of a common size, comprising:*

*forming a first bundle base by laying down a first plurality of transverse sleepers in spaced-apart parallel locations;*

*depositing a first tier of pipes on said bundle base and at each location concavely chocking adjacent pairs of pipes of said tier in spaced-apart relation;*

*traversing the first tier of pipes with a second plurality of transverse sleepers aligned with said first plurality at each location and vertially spaced apart by said chocking from said first plurality a distance substantially equal to or greater than the diameter of said pipes;*

*tightly encircling the pipes of said first tier with strapping adjacent at least two of said locations; and,*

*tightly encircling the sleepers at each location with strapping.*

*9. The shipping bundle formed by the method of claim 7.*

*10. The shipping bundle formed by the method of claim 8.*

*11. The method of claim 8 further including the steps of*

*placing a second tier of pipes upon said second plurality of transverse sleepers and chocking adjacent pairs of pipes in said second tier in spaced-apart relationship;*

*tightly encircling the pipes of said first and second tier with strapping; and*

*overlaying said second tier of pipes with a third plurality of transverse sleepers to form a two tiered pipe bundle.*

*12. The shipping bundle formed by the method of claim 11.*

* * * * *